(12) United States Patent
Tsuchiya et al.

(10) Patent No.: US 11,247,382 B2
(45) Date of Patent: Feb. 15, 2022

(54) BLOW MOLDING MOLD AND BLOW MOLDING APPARATUS

(71) Applicant: NISSEI ASB MACHINE CO., LTD., Nagano (JP)

(72) Inventors: Tomomi Tsuchiya, Nagano (JP); Naoyuki Takada, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 17/044,102

(22) PCT Filed: Apr. 1, 2019

(86) PCT No.: PCT/JP2019/014429
§ 371 (c)(1),
(2) Date: Sep. 30, 2020

(87) PCT Pub. No.: WO2019/194115
PCT Pub. Date: Oct. 10, 2019

(65) Prior Publication Data
US 2021/0146597 A1 May 20, 2021

(30) Foreign Application Priority Data
Apr. 3, 2018 (JP) .............................. JP2018-071686

(51) Int. Cl.
*B29C 49/58* (2006.01)
*B29C 49/76* (2006.01)
*B29C 49/48* (2006.01)

(52) U.S. Cl.
CPC .............. *B29C 49/76* (2013.01); *B29C 49/48* (2013.01); *B29C 49/58* (2013.01); *B29C 2049/4869* (2013.01); *B29C 2049/5858* (2013.01)

(58) Field of Classification Search
CPC ............ B29C 49/58; B29C 2049/5803; B29C 2049/5858; B29C 49/76; B29C 2049/4294
See application file for complete search history.

(56) References Cited

U.S. PATENT DOCUMENTS

| 4,552,527 A | 11/1985 | Hunter |
| 5,792,491 A | 8/1998 | Chaure |

(Continued)

FOREIGN PATENT DOCUMENTS

| CN | 1166151 A | 11/1997 |
| CN | 101444957 A | 6/2009 |

(Continued)

OTHER PUBLICATIONS

International Search Report issued in International Patent Application No. PCT/JP2019/014429, dated May 21, 2019.

(Continued)

*Primary Examiner* — Robert B Davis
(74) *Attorney, Agent, or Firm* — Greenblum & Bernstein, P.L.C.

(57) ABSTRACT

A blow core mold unit includes a first core member configured to be loosely fitted to a neck portion of a preform, a second core member provided around the first core member and in contact with a neck mold, and a third core member provided in a space portion formed between the first core member and the second core member, and the blow core mold unit has a second supply flow path for supplying a high-pressure fluid into the space portion.

7 Claims, 11 Drawing Sheets

(56) References Cited

U.S. PATENT DOCUMENTS

| | | | |
|---|---|---|---|
| 6,179,143 B1 | 1/2001 | Grob | |
| 6,273,705 B1 * | 8/2001 | Schoch | B29C 49/4205 425/535 |
| 6,338,415 B1 | 1/2002 | Grob | |
| 7,147,456 B2 | 12/2006 | Fujii et al. | |
| 2004/0137105 A1 | 7/2004 | Yamaguchi et al. | |
| 2005/0058741 A1 | 3/2005 | Fujii et al. | |
| 2010/0176540 A1 | 7/2010 | Sperka et al. | |
| 2014/0232045 A1 | 8/2014 | Winzinger | |
| 2014/0367895 A1 | 12/2014 | Sato et al. | |
| 2015/0151468 A1 * | 6/2015 | Duclos | B29C 49/58 425/127 |
| 2015/0190975 A1 | 7/2015 | Yokobayashi et al. | |

FOREIGN PATENT DOCUMENTS

| | | |
|---|---|---|
| DE | 202 03 939 U1 | 6/2002 |
| DE | 10 2007 009 026 A1 | 8/2008 |
| JP | 10-502309 A | 3/1998 |
| JP | 2004-181635 A | 7/2004 |
| JP | 2005-066869 A | 3/2005 |
| JP | 2013-132861 A | 7/2013 |
| WO | 2007-057674 A1 | 5/2007 |
| WO | 2014/024835 A1 | 2/2014 |

OTHER PUBLICATIONS

Written Opinion (PCT/ISA/237) issued in International Patent Application No. PCT/JP2019/014429, dated May 21, 2019.
Extended European Search Report issued in European Patent Application No. 19780634.2 dated Nov. 16, 2021.
Office Action issued in Chinese Patent Application No. 201980031238.1 dated Dec. 6, 2021, along with English translation thereof.

* cited by examiner

BLOW MOLDING MOLD AND BLOW MOLDING APPARATUS

TECHNICAL FIELD

The present invention relates to a blow molding mold and a blow molding apparatus for forming a resin container, and particularly to a blow molding mold and a blow molding apparatus suitable for manufacturing a wide-mouthed resin container.

BACKGROUND ART

For example, a resin container made of a thermoplastic resin material such as polyethylene terephthalate (PET) is now widely used because of being excellent in lightness and durability, being easy to handle, and being easy to ensure desired aesthetics. In particular, the resin container is widely used as a container for storing liquid substances such as beverages. In recent years, the uses of the resin container have been expanded further, and wide-mouthed containers for storing semi-solids such as jam and pasta sauce have begun to appear.

As a method for manufacturing such a resin container, generally known is a method of blow-molding, by using a blow molding apparatus, a preform formed by injection molding, and forming a resin container. In the blow molding apparatus, the preform is disposed in a blow molding mold and high-pressure blow air (high-pressure fluid) is introduced into the preform, thereby forming a resin container from the preform.

Specifically, there is a method of blow-molding a preform by accommodating the preform in a blow cavity, press-fitting a tip end portion of a blow core (blow core mold) into a lip portion (neck portion) of the preform to airtightly close the preform, and in this state, introducing a high-pressure fluid (blow air) into the preform through the blow core (see, for example. Patent Literature 1).

In this way, when blow-molding the preform to form a resin container, the blow core is press-fitted into the lip portion (neck portion) of the preform to airtightly close the preform, and thereby the resin container can be formed well while preventing escape of the high-pressure fluid.

CITATION LIST

Patent Literature

Patent Literature 1: JP-A-2004-181635

SUMMARY OF INVENTION

Technical Problem

However, when the tip end portion of the blow core mold having an outer diameter slightly larger than an inner diameter of the neck portion is press-fitted into the neck portion of the preform, the diameter of the neck portion is slightly increased, and as a result, so-called vertical burrs (burrs extending in a vertical direction) may be formed on an outer peripheral surface of the neck portion.

An outer peripheral portion of the neck portion of the preform conveyed to the blow molding apparatus is gripped by a neck mold (lip mold) including a pair of neck split molds. Therefore, when the blow core mold is press-fitted into the neck portion to expand the diameter of the neck portion, the neck mold (the pair of neck split molds) opens slightly by being pushed by the neck portion. At this time, when a resin material enters a gap in the neck mold and the neck mold is closed again as a blow mold closes, vertical burrs may be formed on the neck portion of the preform.

In particular, when an opening diameter of the neck portion of the preform is large, airtightness of the blow core mold tends to decrease, so that it is necessary to increase the outer diameter of the blow core mold. Along with this, an opening amount of the neck mold when the blow core mold is press-fitted into the neck portion also increases, so that vertical burrs are likely to be formed on the neck portion.

The present invention has been made in view of such circumstances, and an object thereof is to provide a blow molding mold and a blow molding apparatus which can prevent escape of a high-pressure fluid from a preform and can prevent formation of vertical burrs on a neck portion of a resin container.

Solution to Problem

An aspect of the present invention for solving the above problem relates to a blow molding mold for forming a resin container by blow-molding a preform, the blow molding mold including a neck mold including a plurality of neck split molds and configured to grip an outer peripheral surface of a neck portion of the preform, a blow cavity mold including a plurality of blow split molds and configured to form an outer peripheral surface of a body portion of the resin container; and a blow core mold unit configured to close an opening of the neck portion of the preform and having a first supply flow path for supplying a high-pressure fluid (blow air) into the preform, wherein the blow core mold unit includes a first core member including a main body having an outer diameter smaller than an inner diameter of the neck portion of the preform and a loosely fitted portion provided at a tip end portion of the main body and configured to be loosely fitted to the neck portion of the preform, a second core member provided on an outer peripheral portion of the main body and in contact with the neck mold, and a third core member having a ring shape, provided in a space portion formed between an outer peripheral surface of the main body and an inner peripheral surface of the second core member so as to be slidable with respect to an outer peripheral surface of the first core member and the inner peripheral surface of the second core member, and configured to contact with a top surface of the neck portion of the preform, and wherein the blow core mold unit has a second supply flow path for supplying the high-pressure fluid into the space portion.

According to the aspect of the present invention, the third core member is pressed toward a blow cavity mold side (preform side) by the high-pressure fluid (blow air) supplied to the space portion through the second supply flow path. Accordingly, when accommodating the preform in the blow molding mold, the third core member is in close contact with the top surface of the neck portion, and the neck portion of the preform is appropriately sealed by the blow core mold unit.

Here, it is preferable that the second supply flow path is connected to an upper side of the space portion. That is, it is preferable that the second supply flow path is connected to an upper space formed above the third core member. Accordingly, the third core member is more appropriately pressed toward the blow cavity mold side (lower side).

In addition, it is preferable that, in a state where the third core member is in contact with the top surface of the preform, an area of an upper surface of the third core member (area receiving a pressure) is equal to or larger than an area of a lower surface of the third core member. Accordingly, the third core member is pressed toward the blow cavity mold side even when the high-pressure fluid flows into a lower surface side of the third core member.

In addition, it is preferable that a protrusion is provided on the upper surface of the third core member to protrude from a part of the upper surface of the third core member. Accordingly, the upper space is always formed above the third core member. Therefore, with the high-pressure fluid flowing above the third core member through the second supply flow path, the third core member is more reliably pressed toward the blow cavity mold side.

In addition, it is preferable that a seal member is provided between the inner peripheral surface of the second core member and an outer peripheral surface of the third core member to close a gap therebetween. That is, it is preferable that the seal member is provided on the inner peripheral surface of the second core member or the outer peripheral surface of the third core member to close the gap between the outer peripheral surface of the third core member and the inner peripheral surface of the second core member. Accordingly, the high-pressure fluid supplied into the space portion is prevented from flowing to the outside of the blow molding mold.

In addition, it is preferable that the second supply flow path is provided to branch from the first supply flow path. Accordingly, the high-pressure fluid can be supplied more appropriately into the space portion.

Further, another aspect of the present invention relates to a blow molding apparatus including the above-described blow molding mold. According to the aspect of the present invention, a resin container can be formed by blow-molding the preform with the neck portion of the preform appropriately sealed by the blow core mold unit.

Advantageous Effects of Invention

According to the blow molding mold and the blow molding apparatus of the present invention, when forming a resin container by blow-molding the preform, the escape of the high-pressure fluid from the preform can be prevented and the formation of vertical burrs on the neck portion of the resin container can be prevented.

DESCRIPTION OF EMBODIMENTS

Hereinafter, an embodiment of the present invention will be described in detail with reference to the drawings.

First, an example of a shape of a resin container formed by a blow molding apparatus according to the present embodiment will be described.

Figure 1:
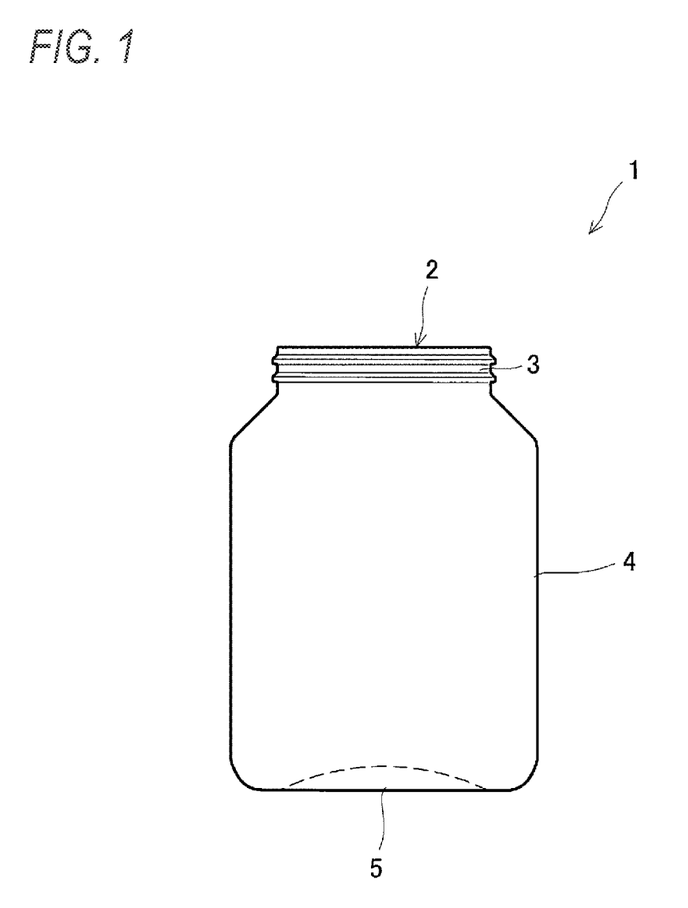
FIG. 1 is a diagram showing an example of a resin container formed by a blow molding mold according to the present invention.

As shown in FIG. 1, a resin container 1 according to the present embodiment includes a cylindrical neck portion 3 having a wide opening 2 on one end side (upper end side), a cylindrical body portion 4 connected to the neck portion 3, and a bottom portion 5 continuous from the body portion 4. The resin container 1 is made of a resin such as polyethylene terephthalate (PET), and is filled with, for example, food or beverage as a content. A size of the resin container 1 is not particularly limited, and in the present embodiment, a diameter of the body portion 4 is formed to be approximately 70 mm.

The resin container 1 is formed by forming a preform, which is an intermediate product, by injection molding, and then blow-molding the preform.

Figure 2:
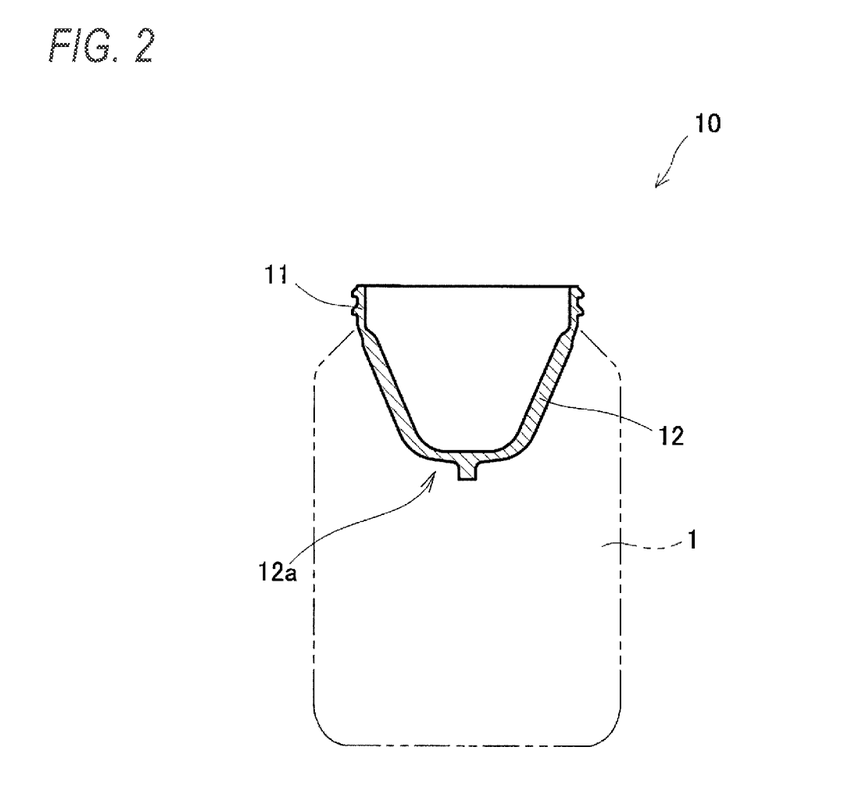
FIG. 2 is a diagram showing an example of a preform for molding the resin container.

As shown in FIG. 2, a preform 10 for forming the resin container 1 includes a neck portion 11 and a bottomed body portion 12 continuous from the neck portion 11. The neck portion 1 is formed to have substantially the same shape as the neck portion 3 of the resin container 1. In the present embodiment, the preform 10 has a relatively large stretch ratio in a vertical axis and a horizontal axis when forming the resin container 1 by blow molding.

Therefore, the body portion 12 of the preform 10 is relatively short and small and is formed in a substantially tapered shape (so-called bowl shape). That is, the body portion 12 of the preform 10 is formed such that a diameter of a boundary portion between the body portion 12 and the neck portion 11 is the largest, and the diameter decreases toward a bottom surface portion 12a side of the body portion 12.

Figure 3:
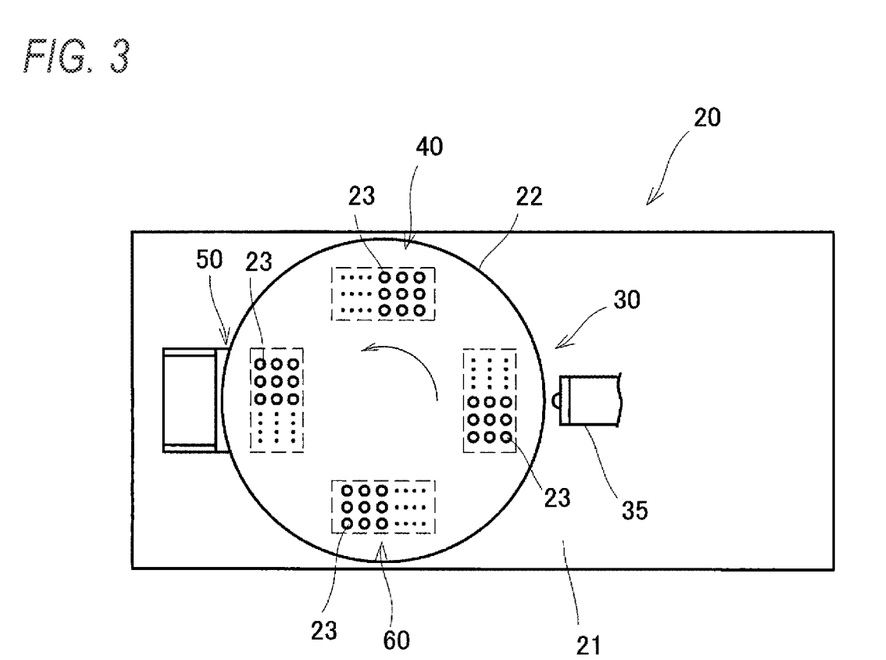
FIG. 3 is a diagram showing a schematic configuration of an injection blow molding apparatus according to the present invention.

Hereinafter, an injection blow molding apparatus for molding the resin container 1 will be described. As shown in FIG. 3, an injection blow molding apparatus 20 according to the present embodiment is a so-called hot parison type (one-step method) apparatus, and includes, on a machine base 21, an injection molding part (injection molding apparatus) 30, a temperature adjustment part (temperature adjustment apparatus) 40, a blow molding part (blow molding apparatus) 50, and a take-out part (take-out apparatus) 60.

A nozzle of an injection part (injection apparatus) 35 is connected to the injection molding part 30, and the injection molding part 30 molds the preform 10 having the above-described shape using a resin material injected from the injection part 35 (injection molding step). The temperature adjustment part 40 performs a temperature adjustment treatment on the injection-molded preform 10, and adjusts the temperature of the preform 10 to an appropriate temperature (temperature adjustment step).

The blow molding part (blow molding apparatus) 50 forms the resin container 1 as a final molded product by, for example, stretching (inflating) the preform 10, subjected to the temperature adjustment treatment performed by the temperature adjustment part 40, in a vertical axis direction by a stretch rod and in a horizontal axis direction by a high-pressure fluid (blow air), that is, blow-molding the preform 10 (blow molding step). The resin container 1 thus formed is taken out to the outside by the take-out part 60 (take-out step).

A rotation plate 22 is provided above the injection molding part 30, the temperature adjustment part 40, the blow molding part 50, and the take-out part 60. The rotation plate 22 is, for example, intermittently rotatable with respect to the machine base 21 in a counterclockwise direction. At each of four locations in a circumferential direction of the rotation plate 22, a neck mold (lip mold) 23 is provided. The preform 10 and the resin container 1 are held by the neck molds 23 and are sequentially transported to a predetermined apparatus by the intermittent rotation of the rotation plate 22.

The present invention is characterized in the blow molding part (blow molding apparatus) 50 of the injection blow molding apparatus 20. Specifically, the present invention is characterized in a blow molding mold provided in the blow molding part (blow molding apparatus) 50. Hereinafter, a structure of the blow molding mold will be described in detail with reference to FIG. 4 to FIG. 11.

Figure 4:
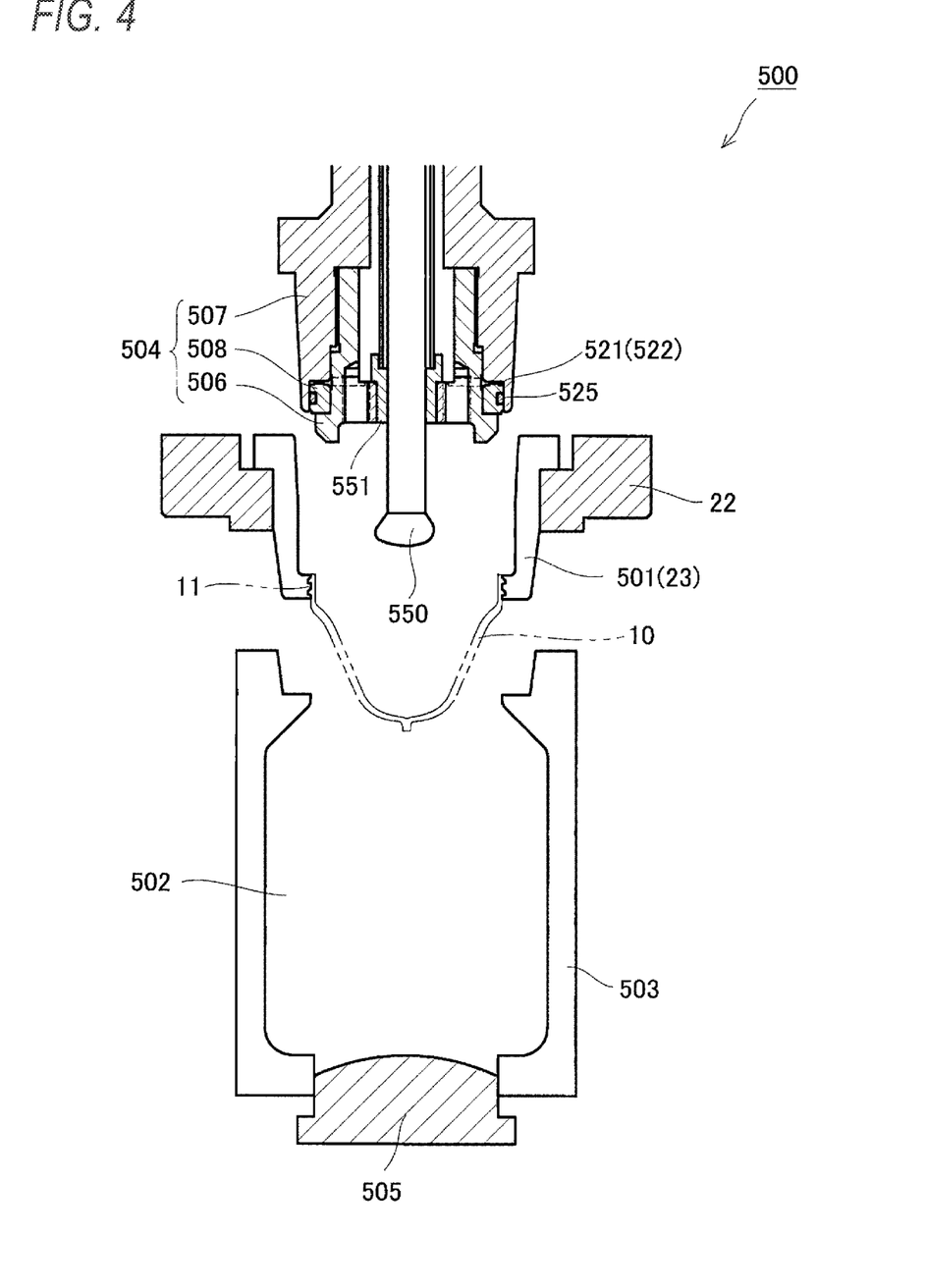
FIG. 4 is a cross-sectional view showing a schematic configuration of a blow molding mold according to an embodiment of the present invention.
Figure 5:
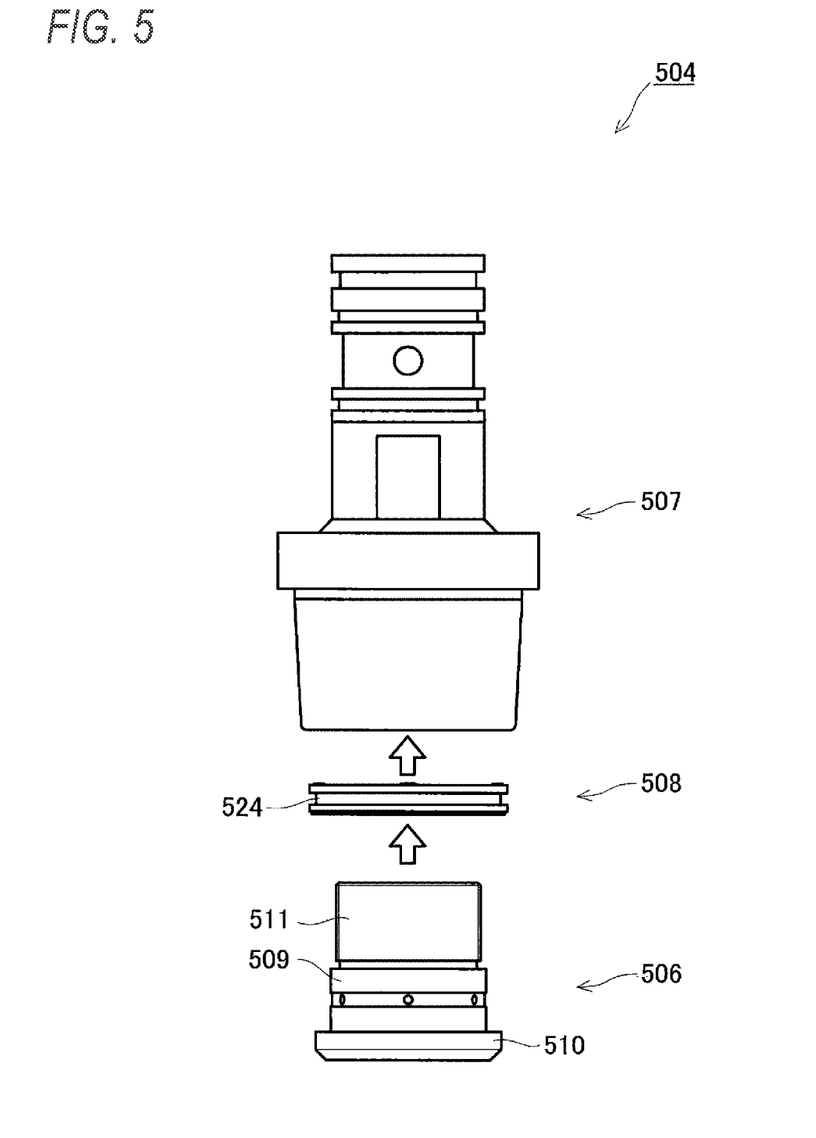
FIG. 5 is an exploded view of a blow core mold unit according to the embodiment of the present invention.
Figure 6:
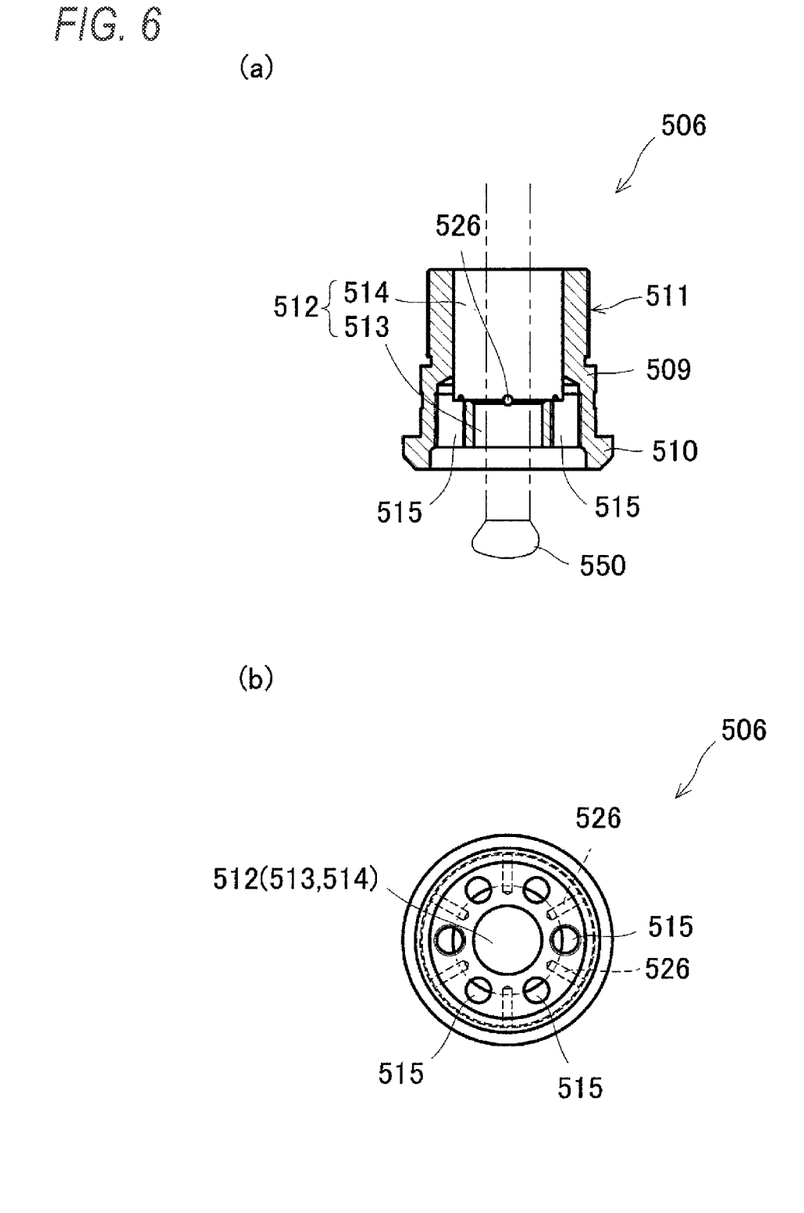
FIG. 6 is a cross-sectional view and a bottom view of a first core member configuring the blow molding mold according to the embodiment of the present invention.
Figure 7:
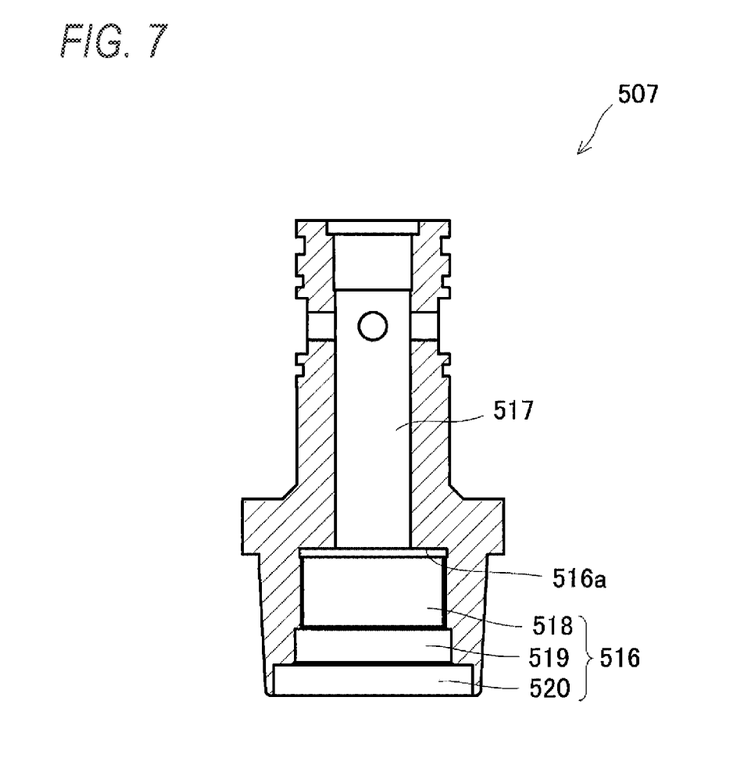
FIG. 7 is a cross-sectional view of a second core member configuring the blow molding mold according to the embodiment of the present invention.
Figure 8:
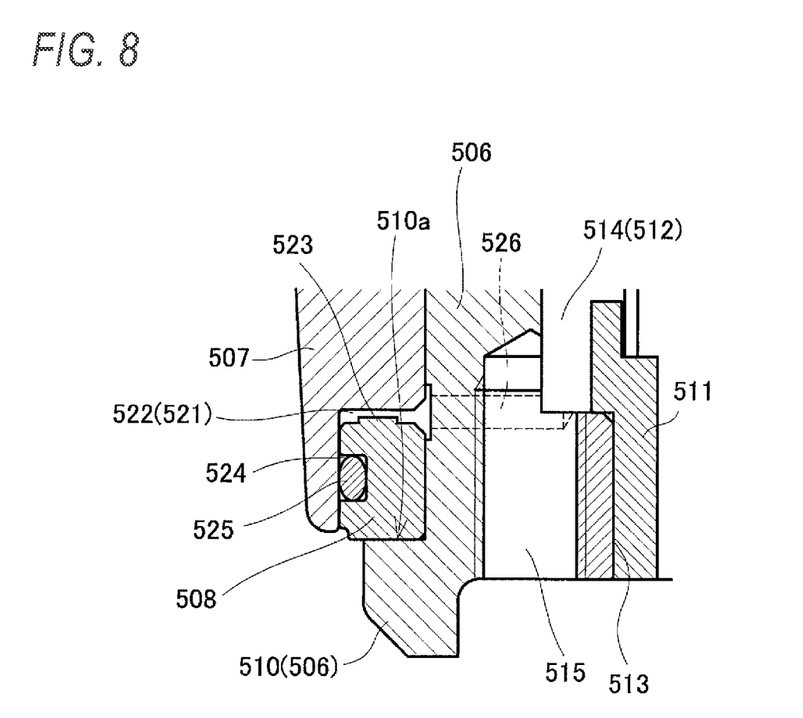
FIG. 8 is an enlarged cross-sectional view of the blow core mold unit according to the embodiment of the present invention.
Figure 9:
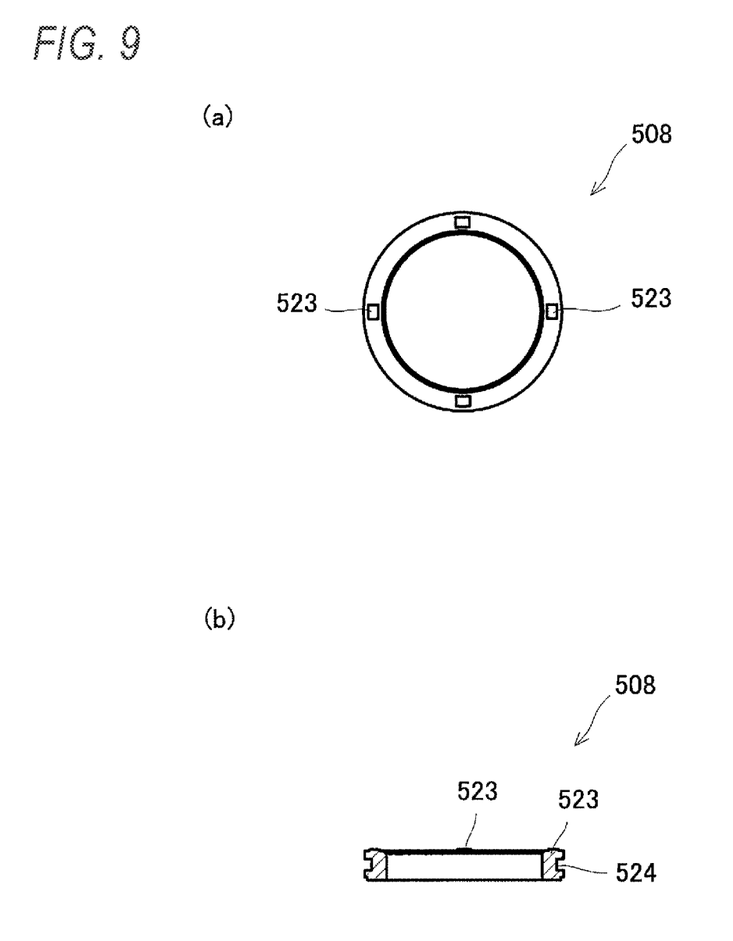
FIG. 9 is a top view and a cross-sectional view of a third core member configuring the blow molding mold according to the embodiment of the present invention.
Figure 10:
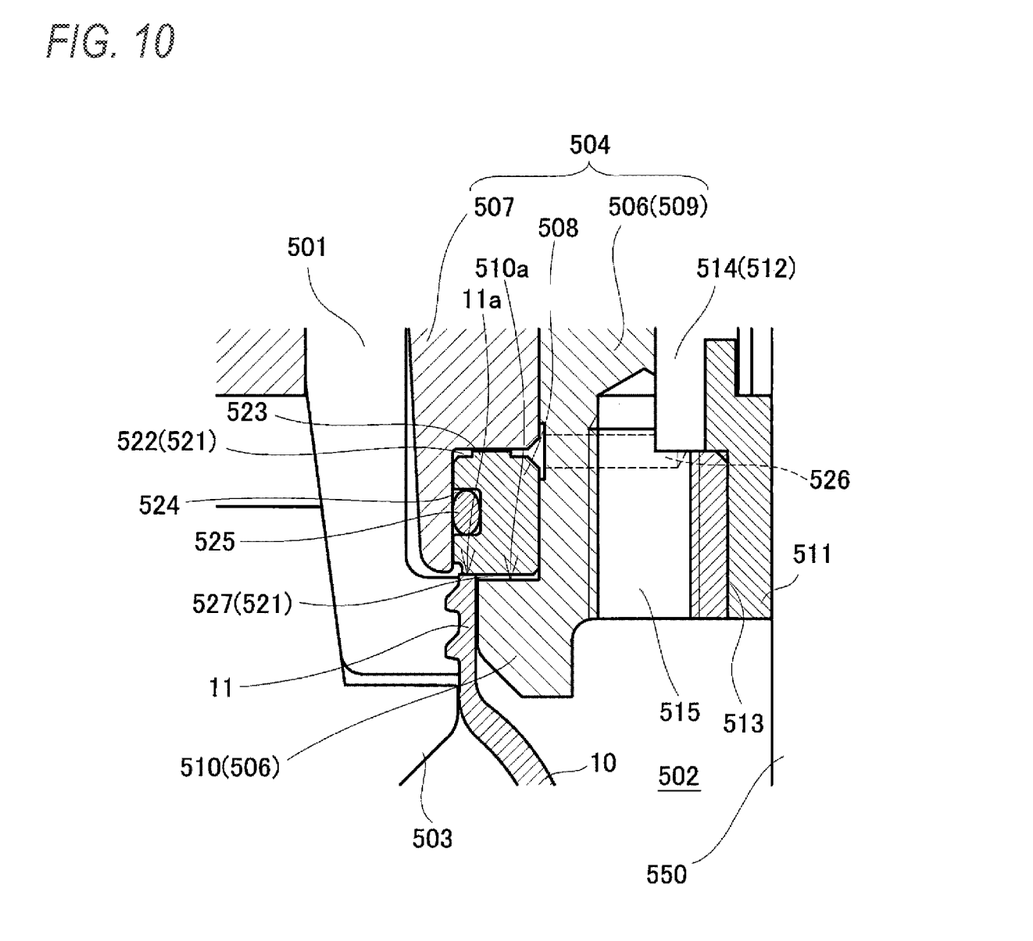
FIG. 10 is a cross-sectional view showing main parts of the blow molding mold according to the embodiment of the present invention.
Figure 11:
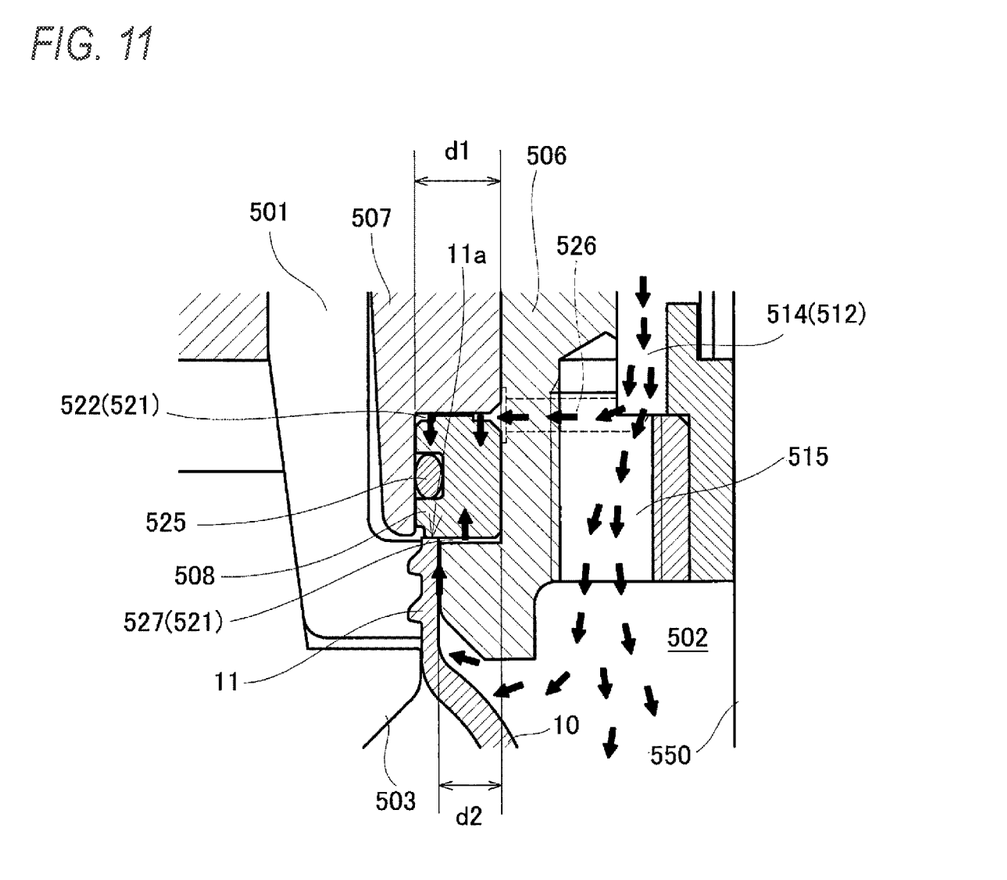
FIG. 11 is a diagram illustrating a flow of blow air supplied through the blow core mold unit according to the embodiment of the present invention.

FIG. 4 is a cross-sectional view of the blow molding mold in an open state, and FIG. 5 is an exploded view of a blow core mold unit. FIG. 6 is a cross-sectional view and a bottom view of a first core member configuring the blow core mold unit, and FIG. 7 is a cross-sectional view of a second core member configuring the blow core mold unit. FIG. 8 is an enlarged cross-sectional view showing main parts of the blow core mold unit, and FIG. 9 is a top view and a cross-sectional view of a third core member configuring the blow core mold unit. FIG. 10 is an enlarged cross-sectional view showing main parts of the blow molding mold in a state where the blow core mold unit is lowered and the mold is closed, and FIG. 11 is a diagram illustrating a flow of blow air supplied through the blow core mold unit.

As shown in FIG. 4, the blow molding mold 500 includes a neck mold 501 (23) common to an injection molding mold included in the injection molding part 30 and the like, a blow cavity mold 503 for forming a blow cavity 502 which is a space for accommodating the preform 10, a blow core mold unit 504 for closing the neck portion 11 of the preform 10, and a bottom mold 505 corresponding to the bottom portion 5 of the resin container 1. The neck mold 501, the blow cavity mold 503, and the bottom mold 505 configuring the blow molding mold 5X) will be briefly described here because of having existing structures.

The neck mold 501 includes a plurality of neck split molds, and in the present embodiment, a pair of neck split molds, and grips an outer peripheral surface of the neck portion 11 of the preform 10. The blow cavity mold 503 includes a plurality of blow split molds, and in the present embodiment, a pair of blow split molds. By closing the pair of blow split molds, the blow cavity 502 is formed inside.

The bottom mold 505 is provided to be able to move up and down with respect to the blow cavity mold 503, and moves up to a predetermined position when the blow cavity mold 503 is closed. In addition, the neck mold 501 is disposed to be clamped by the blow split molds when the pair of blow split molds are closed.

Although not shown, the blow cavity mold 503 is formed with a circulation flow path through which a temperature adjustment medium or a cooling medium circulates, and the preform 10 in contact with the blow cavity mold 503 is heated or cooled to a predetermined temperature.

As shown in FIG. 4 and FIG. 5, the blow core mold unit 504 includes a plurality of members, and in the present embodiment, a first core member 506, a second core member 507, and a third core member 508. That is, in the blow core mold unit 504, the first core member 506, the second core member 507, and the third core member 508 are integrated.

As shown in FIG. 4 to FIG. 6, the first core member 506 includes a main body 509 having a diameter (outer diameter) smaller than an inner diameter of the neck portion 11 of the preform 10 and a loosely fitted portion 510 provided at a lower end side (tip end side) of the main body 509 and loosely fitted to the neck portion 11 of the preform 10. Near an upper end portion of the main body 509, that is, near an end portion on a side opposite to the loosely fitted portion 510, a male screw portion 511 having a thread formed on an outer peripheral portion thereof is formed.

The loosely fitted portion 510 is formed with a diameter (outer diameter) slightly smaller than the inner diameter of the neck portion 1 of the preform 10, and is loosely fitted to the neck portion 11 of the preform 10.

Further, the first core member 506 is formed with an insertion hole 512 through which a stretch rod 550 is inserted. In the present embodiment, the insertion hole 512 includes a first insertion portion 513 provided at a tip end portion side (end portion side on the loosely fitted portion 510 side) of the first core member 506 and a second insertion portion 514 having an inner diameter larger than that of the first insertion portion 513.

The first insertion portion 513 is provided with a guide member 551 that slidably guides the stretch rod 550. The second insertion portion 514 is formed with an inner diameter larger than that of the first insertion portion 513, and a space is ensured around the inserted stretch rod 550.

A plurality of (6 in the present embodiment) through holes 515 connected to the second insertion portion 514 are formed around the first insertion portion 513. Then, as will be described later, the plurality of through holes 515 and the second insertion portion 514 of the insertion hole 512 function as a first supply flow path for supplying blow air (high-pressure fluid) into the preform 10 from a tank or the like (not shown).

The second core member 507 is a member provided on an outer peripheral portion of the main body 509 of the first core member 506 and is in contact with the neck mold 501. Specifically, as shown in FIG. 4. FIG. 5, and FIG. 7, the second core member 507 is formed with an accommodation recess portion 516 for accommodating the main body 509 of the first core member 506 therein and an inserting hole 517 opening to a bottom surface 516a of the accommodation recess portion 516. The stretch rod 550 inserted through the guide member 551 of the first core member 506 is inserted into the inserting hole 517.

On the bottom surface 516a side of the accommodation recess portion 516, a female screw portion 518 having a thread formed on an inner peripheral surface thereof is formed. The first core member 506 and the second core member 507 are fixed by screwing the male screw portion 511 of the main body 50) of the first core member 506 to the female screw portion 518. At this time, an upper end portion of the male screw portion 511 is in contact with the bottom surface 516a of the accommodation recess portion 516, so that the first core member 506 is positioned.

In addition, a lower side of the female screw portion 518 of the accommodation recess portion 516 is formed with a sliding contact portion 519 having an inner diameter nearly the same as the outer diameter of the main body 509 of the first core member 506 and with which the main body 509 is in sliding contact. Further, a lower side of the sliding contact portion 519 is formed with a large diameter portion 520 having an inner diameter larger than the outer diameter of the main body 509 of the first core member 506.

Therefore, in a state where the first core member 506 and the second core member 507 are fixed to each other, as shown in the enlarged view in FIG. 8, a space portion 521 is formed between an outer peripheral surface of the main body 509 of the first core member 506 and an inner peripheral surface of the second core member 507 (inner peripheral surface of the large diameter portion 520), and the third core member 508 is disposed in the space portion 521.

As shown in FIG. 9, the third core member 508 is formed in a ring shape in a top view, and is disposed in the ring-shaped space portion 521 formed by the first core member 506 and the second core member 507. In addition, a groove portion 524 is formed in an outer peripheral surface of the third core member 508 over the entire circumference, and a seal member 525 such as an O-ring is mounted on the groove portion 524 (see FIG. 8).

The third core member 508 is slidable with respect to the outer peripheral surface of the main body 509 of the first core member 506 and the inner peripheral surface of the large diameter portion 520 of the second core member 507. Therefore, when being mounted to the first core member 506, the third core member 508 is held by the first core member 506 in a state of being in contact with an upper surface 510a of the loosely fitted portion 510.

That is, the third core member 508 is movable slightly in an up-down direction within the space portion 521. As shown in FIG. 8, a height of the space portion 521 is larger than a height (thickness) of the third core member 508, and an upper space 522 is ensured above the third core member 508 (between the third core member 508 and an upper surface of the space portion 521).

In the present embodiment, a plurality of protrusions 523 are provided on the upper surface of the third core member 508 to protrude from a part of the upper surface of the third core member 508. Therefore, when the third core member 508 moves upward in the space portion 521, these protrusions 523 come into contact with the upper surface of the space portion 521. Therefore, the upper space 522 is always ensured above the third core member 508.

Here, the first core member 506 is formed with a plurality of communication holes 526 via which the space portion 521 and the second insertion portion 514 communicate with each other. In the present embodiment, as shown in FIG. 6 and FIG. 8, the communication hole 526 connected to the upper space 522 is formed between the through holes 515. As will be described later, the plurality of (for example, 6) communication holes 526 and the second insertion portion 514 of the insertion hole 512 function as a second supply flow path for supplying the high-pressure fluid (blow air) into the space portion 521 (upper space 522).

In the blow molding part 50 including the blow molding mold 500 having such a configuration, by blow-molding the preform 10 disposed in the blow cavity 502 so as to be stretched in the vertical axis direction and the horizontal axis direction (diameter direction), the resin container 1 as a final product is formed (see FIG. 1).

Specifically, when the preform 10 is conveyed into the blow molding mold 500 in a state where the neck portion 11 is gripped by the neck mold 501 (23), the blow core mold unit 504 is lowered, and as shown the enlarged view in FIG. 10, the loosely fitted portion 510 of the first core member 506 is loosely fitted to the neck portion 11 of the preform 10. Accordingly, the third core member 508 comes into contact with a top surface 11a of the neck portion 11, and the neck portion 11 of the preform 10 is sealed.

At this time, it is preferable to lower the blow core mold unit 504 to a position where the upper surface 510a of the loosely fitted portion 510 is lower than the top surface 11a of the neck portion 11 of the preform 10 (inside the preform 10).

In other words, the blow core mold unit 504 may be lowered to a position where at least the third core member 508 is in contact with the top surface 11a of the neck portion 11 of the preform 10, but it is preferable to lower the blow core mold unit 504 to a position where a lower space 527 is formed below the third core member 508.

Accordingly, the third core member 508 can be reliably brought into contact with the top surface 11a of the neck portion 11 of the preform 10.

After lowering the blow core mold unit 504 to an appropriate position in this way, the blow cavity mold 503 is closed. At this time, the neck mold 501 is sandwiched by the blow cavity mold 503, and the neck mold 501 is more firmly clamped.

Thereafter, in a state where the blow molding mold 50 is closed, the stretch rod 550 is lowered and the blow air (high-pressure fluid) is supplied into the preform 10 through the blow core mold unit 504. Accordingly, the preform 10 is stretched in the vertical axis direction and the horizontal axis direction (diameter direction) to form the resin container 1 as a final product.

Here, as indicated by arrows in FIG. 11, when the blow air is supplied into the preform 10 through the second insertion portion 514 and the through holes 515, which form the first supply flow path, the blow air is also supplied into the space portion 521 (upper space 522) through the second insertion portion 514 and the communication hole 526, which form the second supply flow path.

The third core member 508 is pressed downward (toward the preform 10 side) by the blow air supplied to the space portion 521. Accordingly, the third core member 508 is in close contact with the top surface 11a of the neck portion 11 of the preform 10, and the blow air supplied into the preform 10 can be prevented from flowing out.

A small gap is formed between an inner surface of the neck portion 11 of the preform 10 and the outer peripheral surface of the loosely fitted portion 510 of the first core member 506. Therefore, the blow air supplied into the preform 10 may flow into the lower space 527 formed below the third core member 508 through the gap. In this case, the third core member 508 is pressed upward (in the direction away from the preform 10).

However, in a state where the third core member 508 is in contact with the top surface 11a of the neck portion 11 of the preform 10, the area (projected area) of the upper surface of the third core member 508 pressed by the blow air is equal to or larger than the area (projected area) of the lower surface of the third core member 508. In other words, the area (projected area) of the upper surface of the third core member 508 forming the upper space 522 is equal to or larger than the area of the lower surface of the third core member 508 forming the lower space 527.

For example, as shown in FIG. 11, a width d1 of the upper surface of the third core member 508 forming the upper space 522 is wider than a width d2 of the lower surface of the third core member 508 forming the lower space 527, and the width d1 of the upper surface and the width d2 of the lower surface are substantially constant over the entire circumference of the third core member 508.

Therefore, with respect to a force with which the blow air presses the third core member 508, a force with which the blow air presses the third core member 508 downward is greater (a differential pressure due to the blow air is intentionally generated between the upper and lower surfaces of the third core member 508, and the pressing force on the upper surface is set to be always larger than that on the lower surface). That is, in a state where the blow air is supplied to the space portion 521 (upper space 522 and lower space 527), the third core member 508 is pressed toward the preform 10 side (lower side) by the blow air. Therefore, the opening (top surface 11a) of the neck portion 11 of the preform 10 can be appropriately sealed by the third core member 508, and the escape of the blow air from the inside of the preform 10 can be prevented.

The area of the upper surface of the third core member 508 may be smaller than the area of the lower surface as long as the third core member 508 can appropriately brought into close contact with the top surface 11a of the neck portion 11 of the preform 10. For example, since there is influence of the weight of the third core member 508 and the like, the area of the upper surface of the third core member 508 does not necessarily have to be equal to or larger than the area of the lower surface.

Since the seal member 525 is provided on the outer peripheral surface of the third core member 508 to close the gap between the outer peripheral surface of the third core member 508 and the inner peripheral surface of the second core member 507, the blow air supplied into the upper space 522 can also be prevented from flowing out of the blow core mold unit 504 through the gap between the outer peripheral surface of the third core member 508 and the inner peripheral surface of the second core member 507.

Therefore, according to the blow molding mold 500 of the present embodiment, when blow-molding the preform 10 to form the resin container 1, the blow air can be effectively prevented from flowing from the inside to the outside of the preform 10.

In addition, since the tip end portion (loosely fitted portion 510) of the blow core mold unit 504 is loosely fitted without being press-fitted into the neck portion 11 of the preform 10, when inserting the blow core mold unit 504 into the preform 10, the neck mold 501 does not open and vertical burrs are not formed on the neck portion 3 of the resin container 1. Therefore, the resin container 1 having a good appearance can be formed by blow molding.

Although one embodiment of the present invention is described above, the present invention is not limited to the above embodiment. The present invention can be appropriately modified without departing from the scope of the invention.

For example, in the above embodiment, a part of the first supply flow path and a part of the second supply flow path are common, and the second supply flow path is provided by branching from the middle of the first supply flow path. Alternatively, the second supply flow path may be provided independently of the first supply flow path.

In addition, in the above embodiment, the present invention has been described by exemplifying a wide-mouthed resin container. Alternatively, the blow molding mold and the blow molding apparatus according to the present invention can also be applied to molding of resin containers other than the wide-mouthed resin container, for example, a small and lightweight container used for storing beverages, etc., having a relatively small outer diameter of the neck portion (mouth portion).

Further, in the above embodiment, an example in which the preform is formed by injection molding has been described, but the method for forming the preform is not particularly limited. The preform may be formed by, for example, a PCM molding method.

Furthermore, in the above embodiment, the present invention has been described by exemplifying a so-called hot parison type apparatus. Of course, the blow molding mold and the blow molding apparatus according to the present invention can also be applied to an apparatus other than the hot parison type apparatus, for example, a cold parison type apparatus.

REFERENCE SIGNS LIST 1 resin container
10 preform
11 neck portion
11a top surface
20 injection blow molding apparatus
21 machine base
22 rotation plate
23 neck mold
30 injection molding part
35 injection part
40 temperature adjustment part
50 blow molding part
60 take-out part
500 blow molding mold
501 neck mold
502 blow cavity
503 blow cavity mold
504 blow core mold unit
505 bottom mold
506 first core member
507 second core member
508 third core member
509 main body
510 loosely fitted portion
511 male screw portion
512 insertion hole
513 first insertion portion
514 second insertion portion
515 through hole
516 accommodation recess portion
517 inserting hole
518 female screw portion
519 sliding contact portion
520 large diameter portion
521 space portion
522 upper space
523 protrusion
524 groove portion
525 seal member
526 communication hole
527 lower space
550 stretch rod
551 guide member

The invention claimed is:

1. A blow molding mold for forming a resin container by blow-molding a preform, the blow molding mold comprising:
- a neck mold including a plurality of neck split molds and configured to grip an outer peripheral surface of a neck portion of the preform;
- a blow cavity mold including a plurality of blow split molds and configured to form an outer peripheral surface of a body portion of the resin container; and
- a blow core mold unit configured to close an opening of the neck portion of the preform and having a first supply flow path for supplying a high-pressure fluid into the preform, wherein the blow core mold unit includes
- a first core member including a main body having an outer diameter smaller than an inner diameter of the neck portion of the preform and a loosely fitted portion provided at a tip end portion of the main body and configured to be loosely fitted to the neck portion of the preform,
- a second core member provided on an outer peripheral portion of the main body and in contact with the neck mold, and
- a third core member having a ring shape, provided in a space portion formed between an outer peripheral surface of the main body and an inner peripheral surface of the second core member so as to be slidable with respect to an outer peripheral surface of the first core member and the inner peripheral surface of the second core member, and configured to contact with a top surface of the neck portion of the preform, and wherein the blow core mold unit has a second supply flow path for supplying the high-pressure fluid into the space portion.

2. The blow molding mold according to claim 1, wherein the second supply flow path is connected to an upper side of the space portion.

3. The blow molding mold according to claim 1, wherein, in a state where the third core member is in contact with the top surface of the preform, an area of an upper surface of the third core member is equal to or larger than an area of a lower surface of the third core member.

4. The blow molding mold according to claim 1, wherein a protrusion is provided on the upper surface of the third core member to protrude from a part of the upper surface of the third core member.

5. The blow molding mold according to claim 1, wherein a seal member is provided between the inner peripheral surface of the second core member and an outer peripheral surface of the third core member to close a gap therebetween.

6. The blow molding mold according to claim 1, wherein the second supply flow path is provided to branch from the first supply flow path.

7. A blow molding apparatus comprising the blow molding mold according to claim 1.

* * * * *